United States Patent
Li et al.

(10) Patent No.: US 9,213,663 B2
(45) Date of Patent: Dec. 15, 2015

(54) OUTPUT INPUT CONTROL APPARATUS AND CONTROL METHOD THEREOF

(71) Applicant: Nuvoton Technology Corporation, Hsinchu (TW)

(72) Inventors: Kuo-Feng Li, Hsinchu (TW); Yueh-Yao Nain, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 31 days.

(21) Appl. No.: 13/762,375

(22) Filed: Feb. 8, 2013

(65) Prior Publication Data

US 2013/0232286 A1    Sep. 5, 2013

(30) Foreign Application Priority Data

Mar. 3, 2012    (TW) .............................. 101107195 A (51) Int. Cl.
  *G06F 3/00*    (2006.01)
  *G06F 13/20*    (2006.01)
  *G06F 13/40*    (2006.01)

(52) U.S. Cl.
  CPC .................................. *G06F 13/4022* (2013.01)

(58) Field of Classification Search
  CPC ..... H04L 49/254; H04L 49/901; H03B 19/14
  See application file for complete search history.

(56) References Cited

U.S. PATENT DOCUMENTS

| | | | |
|---|---|---|---|
| 4,603,236 A | 7/1986 | Smith et al. | |
| 7,818,529 B2 | 10/2010 | Hou | |
| 7,970,978 B2 * | 6/2011 | Luo et al. | 710/313 |
| 2002/0169917 A1 * | 11/2002 | Chiang et al. | 710/305 |
| 2005/0271202 A1 * | 12/2005 | Shu et al. | 380/29 |
| 2009/0070516 A1 | 3/2009 | Hou | |
| 2009/0300259 A1 * | 12/2009 | Luo et al. | 710/313 |
| 2010/0257300 A1 | 10/2010 | Hou | |

FOREIGN PATENT DOCUMENTS

| | | |
|---|---|---|
| TW | 577019 | 2/2004 |
| TW | 201120637 | 6/2011 |

OTHER PUBLICATIONS

"Office Action of Taiwan Counterpart Application", issued on Jun. 6, 2014, p. 1-7.

* cited by examiner

*Primary Examiner* — Hyun Nam (74) *Attorney, Agent, or Firm* — Jianq Chyun IP Office (57) ABSTRACT

An output input (I/O) control apparatus and a control method thereof are provided. The I/O control apparatus includes an interface control unit, a read-only memory, a random access memory, a multiplexer and a micro-process unit. The interface control unit is coupled to a memory apparatus through a bus, and the memory apparatus is external to the I/O control apparatus. The read-only memory stores judgment codes. The multiplexer is controlled by the micro-process unit to switch to the interface control unit, the read-only memory or the random access memory. When the bus is not busy, the micro-process unit can read data from the memory apparatus. When the bus is occupied and busy, the micro-process unit can read and execute codes from the read-only memory or the random access memory so as to avoid computer system instability or thermal damage.

20 Claims, 5 Drawing Sheets

OUTPUT INPUT CONTROL APPARATUS AND CONTROL METHOD THEREOF

CROSS-REFERENCE TO RELATED APPLICATION

This application claims the priority benefit of Taiwan application serial no. 101107195, filed on Mar. 3, 2012. The entirety of the above-mentioned patent application is hereby incorporated by reference herein and made a part of this specification.

BACKGROUND OF THE INVENTION

1. Field of the Invention

The invention relates to a control technique, and more particularly to an input/output (I/O) control apparatus and a control method thereof.

2. Description of Related Art

Currently, super I/O chips are usually fixed components located on motherboards. The control circuits for middle-speed or low-speed interfaces are integrated in super I/O chip. As so defined, at least 2S, 1P, 1G and 1FD are integrated, which at least means two serial ports (COM1 and COM2), a parallel port, a game/joystick I/O and a set of floppy drive controllers (FDCs) are integrated. Sometimes, the super I/O chip requires a serial peripheral interface flash memory (SPI Flash) for providing instruction codes so that processors (e.g. 8051 micro-processor) in the super I/O chip can normally operate some tasks, such as processes of computer booting up or shutting down, hardware temperature monitoring and fan monitoring.

However, when a chip layout vender announces new requirements during designing, they plan to allow other chip-set to share storage spaces in the SPI Flash. Thus, they allow access byway of sharing a common SPI Bus with the super I/O chip. Since the chip-set has a higher usage privilege, the chip-set has to take the usage privilege upon the SPI Bus quickly. When the chip-set obtains the usage privilege and keeps occupying the SPI Bus, the processor in the super I/O chip can not obtain the instruction codes for operation from the SPI Flash for a long time, and thereby, a malfunction of computer hardware monitoring system occurs. Hence, how to avoid the chip-set from taking the usage privilege of the SPI Bus for a long time, and how the super I/O chip can effectively monitor the computer hardware monitoring system at the same time have become important topics.

SUMMARY OF THE INVENTION

According to one embodiment of the present invention, an I/O control apparatus including an interface control unit, a read-only memory, a random access memory, a multiplexer and a micro-process unit is provided. The interface control unit is externally coupled to a memory apparatus through a bus. The read-only memory can store judgment codes. The random access memory can store basic hardware operation codes. The multiplexer can be configured to switch to the interface control unit, the read-only memory or the random access memory. The micro-process unit is coupled to the interface control unit and the multiplexer. The micro-process unit controls where the multiplexer is switched to.

According to one embodiment of the present invention, a control method adapted to an I/O control apparatus is provided. The I/O control apparatus is externally coupled to a memory apparatus through a bus. When the I/O control apparatus is powered on, a micro-process unit therein can read judgment codes from a read-only memory and execute the same. After the micro-process unit completes executing the judgment codes for the first time, the micro-process unit can read a data from the memory apparatus.

To make the above features and advantages of the invention more comprehensible, several embodiments accompanied with figures are described in detail as follows.

BRIEF DESCRIPTION OF THE FIGURES

The following figures construct a part of the specification, which illustrate the embodiments of the invention. The embodiments of the invention accompanied with figures are described in detail below.

DESCRIPTION OF EMBODIMENTS

Reference will now be made in detail to the exemplary embodiments of the invention, examples of which are illustrated in the accompanying figures. In addition, whenever possible, identical or similar reference numbers are used for identical or similar elements/components in the figures and the embodiments.

Figure 1:
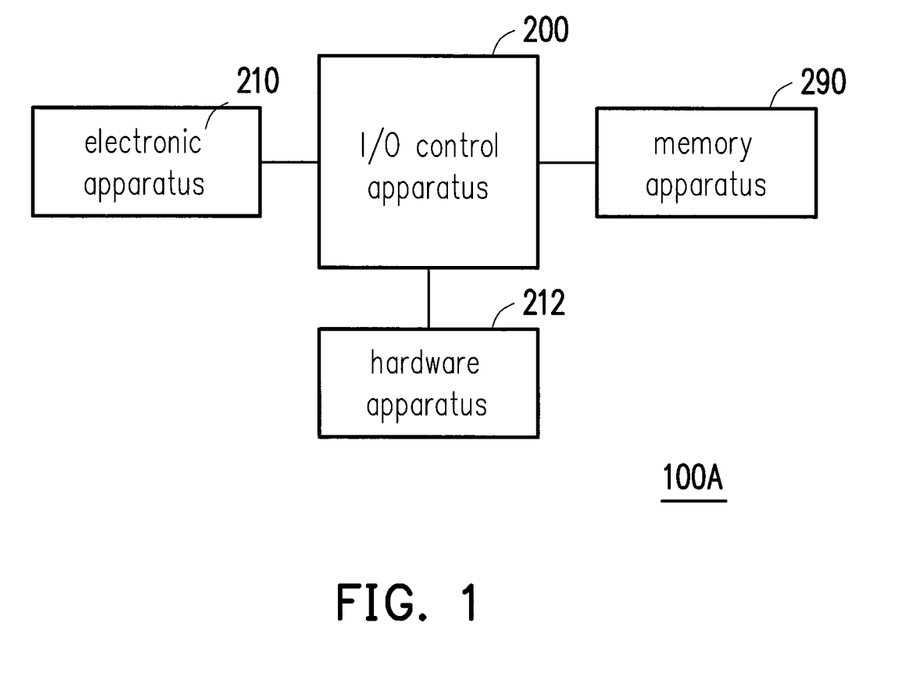
FIG. 1 is a block view illustrating a control system according to an embodiment of the invention.

FIG. 1 is a block view illustrating a control system according to an embodiment of the invention. A control system 100A is described herein, which includes an output input (I/O) control apparatus 200, an electronic apparatus 210, a hardware apparatus 212 and a memory apparatus 290. The I/O control apparatus 200 can be a chip such as super I/O chip. The electronic apparatus 210 includes a chip or a chipset. The memory apparatus 290 can be a flash memory, a random access memory, a static random access memory (SRAM), a dynamic random access memory (DRAM) or a combination thereof. The hardware apparatus 212 can be a hardware temperature monitor, a fan, serial ports (COM1 and COM2), a parallel port or a combination thereof.

Figure 2:
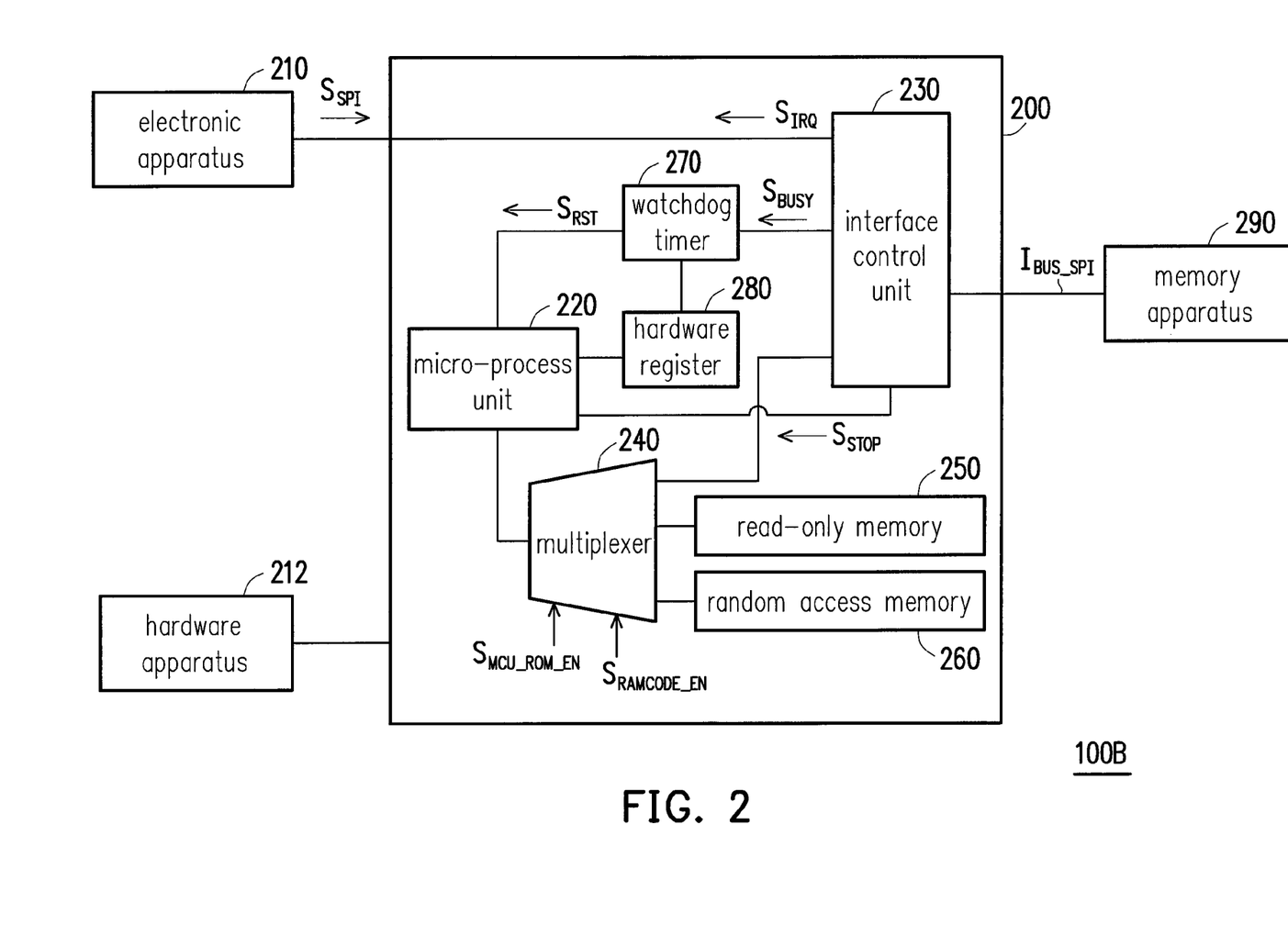
FIG. 2 is a block view illustrating a control system according to another embodiment of the invention.

Based on the architecture of FIG. 1, FIG. 2 is a block view illustrating a control system 100B according to another embodiment of the invention. Each component thereof and the operation thereof will be described in detail as follows. Referring to FIG. 2, in this embodiment, the I/O control apparatus 200, the electronic apparatus 210 and the memory apparatus 290 can be respectively located on different chips. The I/O control apparatus 200 is electrically connected with the electronic apparatus 210, the hardware apparatus 212 and the memory apparatus 290, respectively. Here, the electronic apparatus 210 is connected with the memory apparatus 290 through the I/O control apparatus 200.

The I/O control apparatus 200 can include a micro-process unit 220, an interface control unit 230, a multiplexer 240, a read-only memory (ROM) 250, a random access memory (RAM) 260, a watchdog timer 270 and a hardware register 280. The interface control unit 230 is coupled to the memory apparatus 290 through a bus $I_{BUS\_SPI}$. The bus $I_{BUS\_SPI}$ can be a serial peripheral interface (SPI) bus. The electronic apparatus 210 is also coupled to the interface control unit 230. The micro-process unit 220 is coupled to the interface control unit 230 and the multiplexer 240. The read-only memory 250 can be configured to store judgment codes. The random access memory 260 can be configured to store basic hardware operation codes. The basic hardware operation codes are associated with hardware monitoring and fan controlling, but the invention is not limited thereto. The micro-process unit 220 controls how the multiplexer 240 is switched to. The multiplexer 240 is configured to be switched to one route to the interface control unit 230, the read-only memory 250 or the random access memory 260. The watchdog timer 270 is coupled to the micro-process unit 220 and the interface control unit 230 and located therebetween. The hardware register 280 is configured to store a serial peripheral interface (SPI) reset flag.

When the entire control system 100B is powered on to operate, the multiplexer 240 is switched to the read-only memory 250 by the micro-process unit 220 in the I/O control apparatus 200 so that the judgment codes are read and executed. Thereby, the micro-process unit 220 compares the SPI reset flag in the hardware register 280 with the judgment codes stored in the read-only memory 250. However, since the control system 100B is just powered on to operate at this time, the electronic apparatus 210 may not share a storage space in the memory apparatus 290 with the I/O control apparatus 200. Therefore, a result of the aforementioned comparison indicates that a usage privilege of the bus $I_{BUS\_SPI}$ is not taken by the electronic apparatus 210 yet. The micro-process unit 220 now reads instruction codes from the memory apparatus 290 through the interface control unit 230 to operate tasks, such as processes of computer booting up or shutting down, hardware temperature monitoring and fan monitoring. Meanwhile, in the case of normal use, the micro-process unit 220 can load a part of the instruction codes in the memory apparatus 290 (such as some of the basic hardware operation codes related to a hardware monitor control or a fan control) to the random access memory 260, and when a usage privilege of the bus $I_{BUS\_SPI}$ is occupied by the electronic apparatus 210, the micro-process unit 220 can read and execute the basic hardware operation codes from the random access memory 260.

The electronic apparatus 210 transmits a data through the interface control unit 230 to the memory apparatus 290 and stores the data therein. The electronic apparatus 210 shares the storage space in the memory apparatus 290 with the I/O control apparatus 200. Here, the electronic apparatus 210 has a usage privilege of the memory apparatus 290 higher than the I/O control apparatus 200, that means electronic apparatus 210 access to memory apparatus 290 is given higher priority than I/O control apparatus 200 access to memory apparatus 290.

Thus, when the electronic apparatus 210 is about to transmit the data to the memory apparatus 290, the electronic apparatus 210 sends an interface major control signal $S_{SPI}$ to the interface control unit 230. Thus, the interface control unit 230 is aware of this event, and the interface control unit 230 can send a stopping signal $S_{STOP}$ to the micro-process unit 220, and the micro-process unit 220 can stop reading the data from the memory apparatus 290. At this time, the electronic apparatus 210 takes the usage privilege of the bus $I_{BUS\_SPI}$. The interface control unit 230 can send a busy signal $S_{BUSY}$ to the watchdog timer 270. If the watchdog timer 270 continuously receives the busy signal $S_{BUSY}$ during a predetermined period, or a usage frequency of the bus $I_{BUS\_SPI}$ during a predetermined period is higher than a preset value, the watchdog timer 270 can send a resetting signal $S_{RST}$ to the micro-process unit 220. Meanwhile, the watchdog timer 270 can also store the SPI reset flag in the hardware register 280. The SPI reset flag can be "1" or other more complex signal.

When the micro-process unit 220 receives the resetting signal $S_{RST}$, the micro-process unit 220 can reset, and can send a switching control signal, $S_{MCU\_ROM\_EN}$ or/and $S_{RAM\_CODE\_EN}$, to the multiplexer 240. Accordingly, the multiplexer 240 is switched to the read-only memory 250, and the micro-process unit 220 can read the judgment codes stored in the read-only memory 250 so as to determine whether the bus $I_{BUS\_SPI}$ is still occupied. Otherwise, the interface control unit 230 can timely send an interruption signal $S_{IRQ}$ to request a chip-set of the electronic apparatus 210 not to frequently or continuously occupy the bus $I_{BUS\_SPI}$.

The micro-process unit 220 can compare the SPI reset flag in the hardware register 280 with the judgment codes. If the comparison result indicates that the electronic apparatus 210 would continuously or high-frequently takes the usage privilege of the bus $I_{BUS\_SPI}$, the multiplexer 240 is switched to the random access memory 260 by the micro-process unit 220 so that the micro-process unit 220 reads the basic hardware operation codes and executes the same. Accordingly, the micro-process unit 220 operates the basic hardware operation codes for the hardware apparatus 212.

If the comparison result indicates that the electronic apparatus 210 releases the usage privilege of the bus $I_{BUS\_SPI}$, the micro-process unit 220 also notifies the multiplexer 240 to switch to the interface control unit 230 so that the interface control unit 230 no longer sends the busy signal $S_{BUSY}$ to the watchdog timer 270. In the meantime, the micro-process unit 220 reads the instruction codes from the memory apparatus 290 through the interface control unit 230 to operate tasks. The watchdog timer 270 may also clear the SPI reset flag in the hardware register 280.

When the reset micro-process unit 220 completes executing the judgment codes, the micro-process unit 220 can further proceed with switching according to whether the busy signal $S_{BUSY}$ is still received, and if the busy signal $S_{BUSY}$ is received, the multiplexer 240 is switched to the random access memory 260 so that the micro-process unit 220 reads and executes basic hardware operation codes from the random access memory 260, and if the busy signal $S_{BUSY}$ is not received, the multiplexer 240 is switched to the memory apparatus 290 by the micro-process unit 220 so that the micro-process unit 220 reads the data from the memory apparatus 290.

When the multiplexer 240 is switched to the random access memory 260, and the micro-process unit 220 completes executing the basic hardware operation codes, the micro-process unit 220 can further proceed with switching according to whether the busy signal $S_{BUSY}$ is still received, and if the busy signal $S_{BUSY}$ is received, the multiplexer 240 is switched to the read only memory 250, and if the busy signal $S_{BUSY}$ is not received, the multiplexer 240 is switched to the memory apparatus 290 so that the micro-process unit 220 reads the data from the memory apparatus 290.

Therefore, the control system of the embodiment of the invention may timely proceed with hardware monitoring or fan controlling so as to avoid computer system instability or thermal damage, and issues appearing in the related art may be resolved.

In addition, the I/O control apparatus 200 and the electronic apparatus 210 of the invention of an embodiment may be integrated together on a single chip. Or, the I/O control apparatus 200, the electronic apparatus 210 and the memory apparatus 290 may be integrated on a single chip or a single chip packaging structure. The I/O control apparatus 200, the electronic apparatus 210 and the memory apparatus 290 may also be located on different chips.

Figure 3:
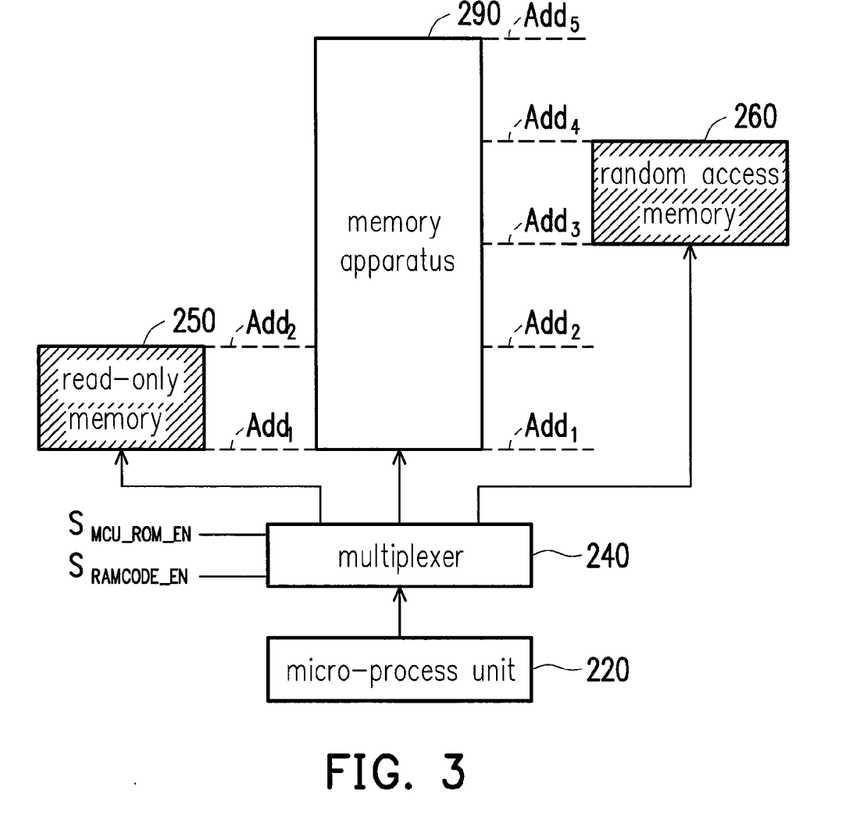
FIG. 3 is a schematic view illustrating how a memory control system is switched according to an embodiment consistent with the invention.
Figure 4:
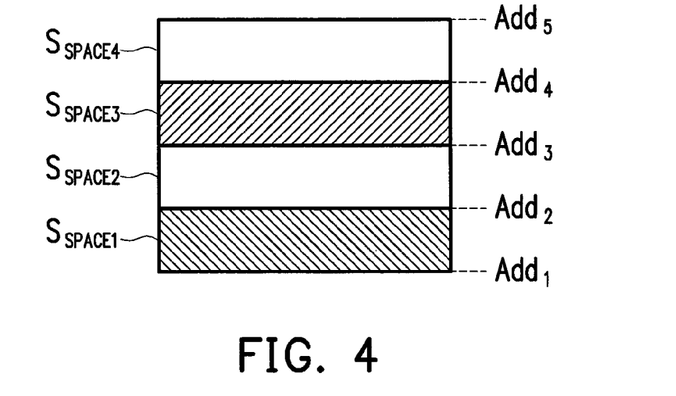
FIG. 4 is a schematic view illustrating program code spaces according to an embodiment of the invention.

FIG. 3 is a schematic view illustrating memory access switching of a memory control system according to an embodiment of the invention. FIG. 4 is a schematic view illustrating program code spaces according to an embodiment of the invention. Referring to both FIG. 3 and FIG. 4, the program code spaces, $S_{SPACE1}$ through $S_{SPACE4}$, of the micro-process unit 220 can be assembled by the read-only memory 250, the memory apparatus 290 and the random access memory 260. Here, the program code spaces, $S_{SPACE1}$, $S_{SPACE2}$, $S_{SPACE3}$ and $S_{SPACE4}$ are respectively addressed at $Add_1$ through $Add_2$, $Add_2$ through $Add_3$, $Add_3$ through $Add_4$ and $Add_4$ through $Add_5$. The program code spaces corresponding to the memory apparatus 290 includes $S_{SPACE1}$ through $S_{SPACE4}$. The memory apparatus 290 shares the addresses, $Add_1$ through $Add_2$, with the read-only memory 250. The memory apparatus 290 shares the addresses, $Add_3$ through $Add_4$, with the random access memory 260.

The micro-process unit 220 may send the switching control signal $S_{MCU\_ROM\_EN}$ so that the micro-process unit 220 is switched to the read-only memory 250 so as to read the judgment codes. The micro-process unit 220 may also send the switching control signal $S_{RAMCODE\_EN}$ so that the micro-process unit 220 is switched to the random access memory 260 so as to read the basic hardware operation codes.

Figure 5:
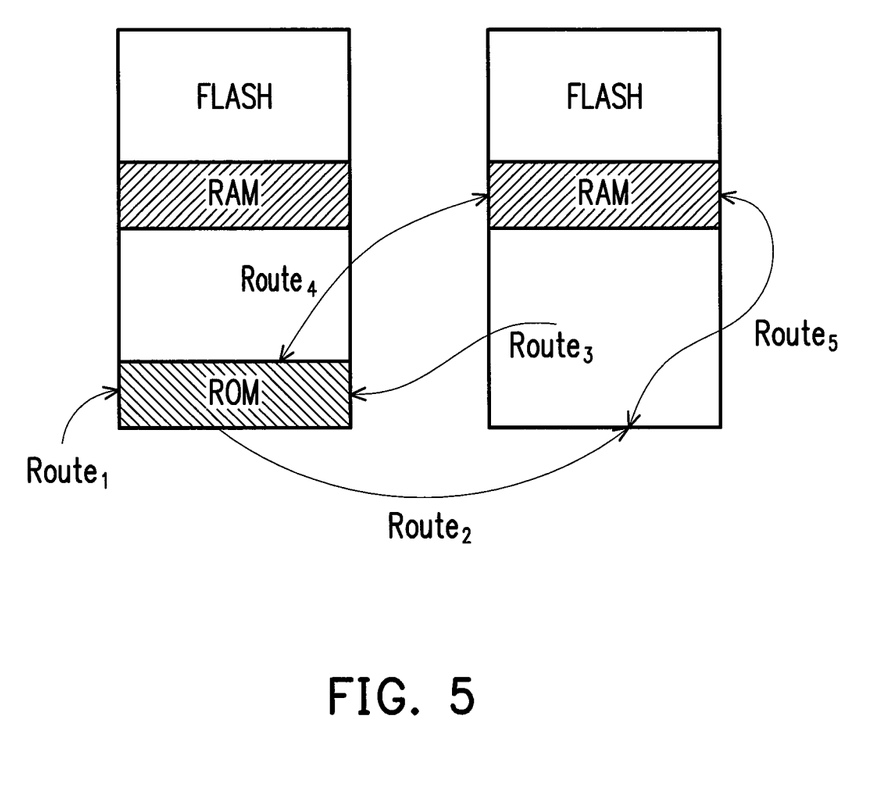
FIG. 5 is a schematic view illustrating a switching process according to an embodiment of the invention.

In order to provide those skilled in the art with better understanding of the scope of the embodiment of the invention, an embodiment with reference to FIG. 5 is described hereinafter. FIG. 5 is a schematic view illustrating a switching process according to an embodiment of the invention. Referring to both FIG. 2 and FIG. 5, a first route, Route$_1$, indicates that when the I/O control apparatus 200 is powered on, the program code spaces of the micro-process unit 220 are switched to a read-only memory (ROM) mode. Under the ROM mode, the micro-process unit 220 may be aware via the SPI reset flag in the hardware register 280 whether the ROM mode is entered by a standard power-on procedure or by other ways. For example, when the bus $I_{BUS\_SPI}$ is busy, the watch-dog timer 270 sends a resetting signal $S_{RST}$ so that the program code spaces of the micro-process unit 220 is switched back to the ROM mode.

Under the ROM mode, if the reset of the micro-process unit 220 is not because the bus $I_{BUS\_SPI}$ is busy, then a second route, Route$_2$, to a flash mode can be entered. That is, under a standard usage, the micro-process unit 220 can reset and then be switched to the memory apparatus 290.

Under the flash mode, when the bus $I_{BUS\_SPI}$ is busy for a certain period, the watchdog timer 270 can send the resetting signal $S_{RST}$ so that the micro-process unit 220 can reset. At this time, the program code spaces corresponding to the micro-process unit 220 can be switched back to the ROM mode through a third route, Route$_3$. At this time, the micro-process unit 220 may also be aware via the SPI reset flag in the hardware register 280 that the ROM mode is entered due to the resetting signal $S_{RST}$ sent by the watchdog timer 270.

When the reset micro-process unit 220 completes executing the judgment codes under the ROM mode, and if the bus $I_{BUS\_SPI}$ is still busy, the program code spaces of the micro-process unit 220 are switched to the random access memory 260 to read instruction codes associated with the basic hardware operation codes, as a fourth route, Route$_4$. At last, when the busy bus $I_{BUS\_SPI}$ is released, or the electronic apparatus 210 is not so frequently used, the micro-process unit 220 can return back to the flash mode to execute the instruction codes though a fifth route, Route$_5$.

Figure 6:
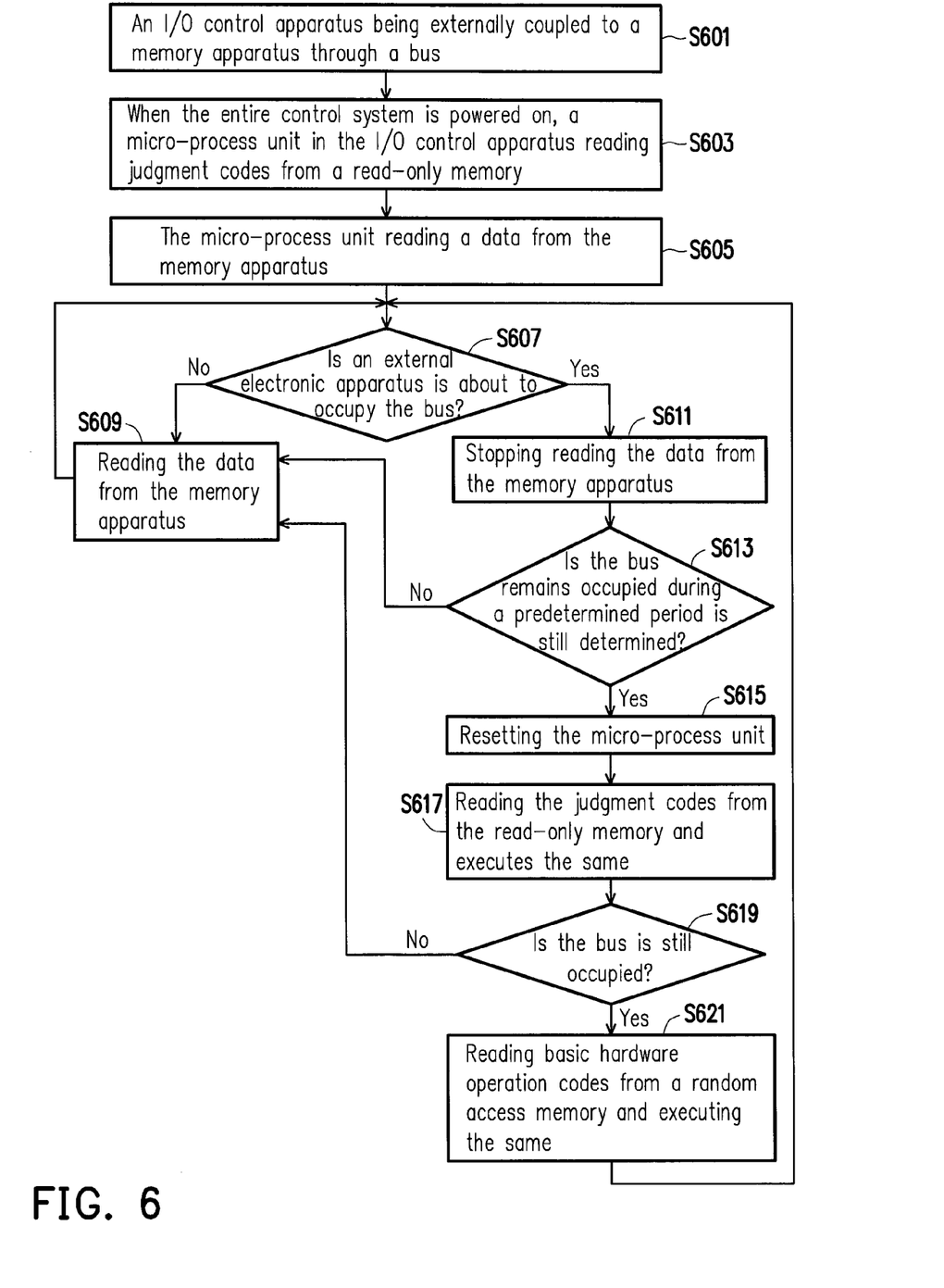
FIG. 6 is a flow chart illustrating a control method according to an embodiment of the invention.

Based on the embodiment as described above, a commonly used control method is concluded. For clear description, FIG. 6 is a flow chart illustrating a control method according to an embodiment of the invention. Referring to FIG. 6, the control method according to the present embodiment includes following steps.

In step S601, an I/O control apparatus is externally coupled to a memory apparatus through a bus. The bus can be a serial peripheral interface (SPI) bus.

Next, in step S603, when the entire control system is powered on, a micro-process unit in the I/O control apparatus under a default mode reads judgment codes from a read-only memory and executes the same.

Then, in step S605, when the micro-process unit completes executing the judgment codes for the first time, the micro-process unit reads a data from the memory apparatus.

Afterward, in step S607, the micro-process unit determines whether an external electronic apparatus is about to occupy the bus. If the determination result is false, in step S609, the micro-process unit can read the data from the memory apparatus. Then, step S607 is returned to, and another determination and execution processes are proceeded.

Otherwise, if the determination result in step S607 is true, in step S611, the micro-process unit can stop reading the data from the memory apparatus. After that, in step S613, whether the bus is still occupied during a predetermined period is still determined. If the bus is not still occupied during the predetermined period, in step S609, the micro-process unit can read the data from the memory apparatus.

In step S613, if the bus is still occupied during the predetermined period, then, in step S615, the micro-process unit can reset. Then, in step S617, the micro-process unit can read the judgment codes from the read-only memory and execute the same. Next, in step S619, whether the bus is still occupied is determined. If the bus is not occupied, then, step S609 is returned to, in which the micro-process unit can read the data from the memory apparatus.

In step S619, if the bus is still occupied, then, in step S621, the micro-process unit can read basic hardware operation codes from the random access memory and execute the same. Next, step S607 is again returned to, and another determination and execution processes are further proceeded. For example, if the bus is occupied, the micro-process unit reads the judgment codes from the read-only memory, and if the bus is not occupied, the micro-process unit reads the data from the memory apparatus.

In view of the foregoing, the embodiment of the invention arranges the program code spaces according to whether the bus is used. When the bus is occupied and busy, the micro-process unit may read program codes from either the read-only memory or the random access memory so as to timely proceed with hardware monitoring and fan controlling. Accordingly, issues appearing in the related art is resolved so as to avoid control system instability or thermal damage.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An output input (I/O) control apparatus, comprising:
   an interface control unit, externally coupled to a memory apparatus through a bus, controlling the memory apparatus being accessed by a electronic apparatus;
   a first memory, storing a plurality of codes;

a second memory;
a multiplexer, coupled to the first memory, the second memory, and the interface control unit; and
a micro-process unit, coupled to the interface control unit and the multiplexer, executing the codes to determine whether the bus is being occupied by the electronic apparatus, wherein the multiplexer is configured to switch to one of the interface control unit, the first memory, or the second memory, so as to establish an electrical connection between the micro-process unit and one of the interface control unit, the first memory, or the second memory through the multiplexer, and the micro-process unit is configured to control where the multiplexer is switched to,
wherein when the bus is occupied by the electronic apparatus, the multiplexer is switched to the second memory so that the micro-process unit reads and executes basic hardware operation codes from the second memory for communicating with a hardware apparatus,
wherein if the bus is not occupied by the electronic apparatus, the multiplexer is switched to the memory apparatus by the micro-process unit so that the micro-process unit reads and executes the basic hardware operation codes from the memory apparatus for communicating with the hardware apparatus.

2. The I/O control apparatus according to claim 1, wherein when the I/O control apparatus is powered on, the multiplexer is switched to the first memory by default, the micro-process unit reads and executes the codes so that the multiplexer is switched to the memory apparatus by the micro-process unit through the interface control unit, and the micro-process unit reads a data stored in the memory apparatus.

3. The I/O control apparatus according to claim 2, wherein when the interface control unit is aware that an electronic apparatus from the external is about to occupy the bus, the interface control unit sends a stopping signal to the micro-process unit so that the micro-process unit stops reading the data from the memory apparatus.

4. The I/O control apparatus according to claim 3, further comprising:
a watchdog timer, coupled to the interface control unit and the micro-process unit,
wherein when the electronic apparatus occupies the bus, the interface control unit sends a busy signal to the watchdog timer, and when the watchdog timer continuously receives the busy signal during a predetermined period, the watchdog timer sends a resetting signal to the micro-process unit.

5. The I/O control apparatus according to claim 4, wherein when micro-process unit receives the resetting signal, the micro-process unit is reset and the multiplexer is switched to the first memory by the micro-process unit, and the micro-process unit reads and executes the codes.

6. The I/O control apparatus according to claim 5, wherein when the reset micro-process unit completes executing the codes, the micro-process unit further proceeds with switching according to whether the busy signal is still received, and when the busy signal is received, the multiplexer is switched to the second memory so that the micro-process unit reads and executes basic hardware operation codes previously loaded into the second memory, and when the busy signal is not received, the multiplexer is switched to the memory apparatus by the micro-process unit so that the micro-process unit reads the data from the memory apparatus.

7. The I/O control apparatus according to claim 6, wherein when the multiplexer is switched to the second memory, and the micro-process unit completes executing the basic hardware operation codes, the micro-process unit further proceeds with switching according to whether the busy signal is still received, and when the busy signal is received, the multiplexer is switched to the first memory, and when the busy signal is not received, the multiplexer is switched to the memory apparatus so that the micro-process unit reads the data from the memory apparatus.

8. The I/O control apparatus according to claim 1, wherein the bus is a serial peripheral interface (SPI) bus.

9. The I/O control apparatus according to claim 1, wherein the basic hardware operation codes are read and executed by the micro-process unit so as to timely proceed with hardware monitoring or fan controlling.

10. The I/O control apparatus according to claim 1, wherein the memory apparatus coupled to the interface control unit is a flash memory.

11. The I/O control apparatus according to claim 3, wherein the I/O control apparatus is integrated with the electronic apparatus on a single chip.

12. The I/O control apparatus according to claim 3, wherein the I/O control apparatus is integrated with the electronic apparatus and the memory apparatus on a single chip packaging structure.

13. A control method for an I/O control apparatus, the control method comprising:
the I/O control apparatus being externally coupled to a memory apparatus through a bus;
when the I/O control apparatus is powered on, a micro-process unit therein reading a plurality of codes from a first memory and executing the same, wherein the codes is executed to determine whether the bus is being occupied by an electronic apparatus; and
when the bus is not occupied by the electronic apparatus, the micro-process unit reading basic hardware operation codes from the memory apparatus,
when the bus is occupied by the first external apparatus, the micro-process unit reading the basic hardware operation codes from a second memory,
the micro-process unit executing the basic hardware operation codes to timely communicate with a hardware apparatus.

14. The control method according to claim 13, wherein when the I/O control apparatus is aware that an electronic apparatus from the external is about to occupy the bus, the micro-process unit stops reading the data from the memory apparatus.

15. The control method according to claim 14, wherein when the bus is occupied by the electronic apparatus, and when the bus is continuously occupied for a predetermined period, the micro-process unit is reset.

16. The control method according to claim 15, wherein when the micro-process unit is reset due to the bus being occupied, the micro-process unit reads the codes from the first memory and executes the same.

17. The control method according to claim 16, wherein when the reset micro-process unit completes executing the codes, the micro-process unit further proceeds with switching according to whether the bus is still occupied, and when the bus is occupied, the micro-process unit reads basic hardware operation codes from a second memory in the I/O control apparatus and executes the same, and when the bus is not occupied, the micro-process unit reads the data from the memory apparatus.

18. The control method according to claim 17, wherein when the micro-process unit completes executing the basic hardware operation codes, the micro-process unit further proceeds with switching according to whether the bus is still occupied, and when the bus is occupied, the micro-process unit reads the codes from the first memory, and if the bus is not occupied, the micro-process unit reads the data from the memory apparatus.

19. The control method according to claim 14, wherein the I/O control apparatus is further integrated with the electronic apparatus on a single chip.

20. The control method according to claim 14, wherein the I/O control apparatus is further integrated with the electronic apparatus and the memory apparatus on a single chip packaging structure.

* * * * *